United States Patent
Leblang et al.

(10) Patent No.: US 8,953,841 B1
(45) Date of Patent: Feb. 10, 2015

(54) USER TRANSPORTABLE DEVICE WITH HAZARD MONITORING

(75) Inventors: Jonathan A. Leblang, Menlo Park, CA (US); James D. Mackraz, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 13/607,145

(22) Filed: Sep. 7, 2012

(51) Int. Cl.
*G06K 9/00* (2006.01)

(52) U.S. Cl.
CPC .................................. *G06K 9/00671* (2013.01)
USPC .......................................... 382/103; 345/633

(58) Field of Classification Search
None
See application file for complete search history.

(56) References Cited

U.S. PATENT DOCUMENTS

2008/0319602 A1\* 12/2008 McClellan et al. ............. 701/33
2010/0208033 A1\* 8/2010 Edge et al. ...................... 348/46
2013/0045759 A1\* 2/2013 Smith ......................... 455/456.6
2013/0293586 A1\* 11/2013 Kaino et al. ................... 345/633
2014/0085334 A1   3/2014 Payne

OTHER PUBLICATIONS

Google, "Walk and Text—Android Apps on Google Play", retrieved on Aug. 5, 2012 at https://play.google.com/store/apps/details?id=com.incorporateapps.walktext,3 pgs.
iTunes, "WalkNText (Type N Walk + Flashlight)", by Incorporate Apps, retrieved on Aug. 5, 2012 at http://itunes.apple.com/us/app/walkntext/id496962781, 2 pgs.

\* cited by examiner

*Primary Examiner* — Bhavesh Mehta
*Assistant Examiner* — Siamak Harandi
(74) *Attorney, Agent, or Firm* — Lee & Hayes, PLLC

(57) ABSTRACT

In some examples, a user transportable device may determine, based at least in part on sensor input, that the device is in motion. For example, the device may determine there is a likelihood that a user of the device is walking, running, traveling in a vehicle, or the like. In response, the device may present, on a display, an image obtained from a camera oriented, at least in part, toward a direction of travel. Further, in some examples, one or more images from the camera and/or sensor input from other sensors on the device may be analyzed to detect whether an object, obstruction or other hazard is in a direction of travel of the user of the device. If the device determines that a hazard may be imminently encountered by the user, the device may provide an alert to the user.

29 Claims, 9 Drawing Sheets

USER TRANSPORTABLE DEVICE WITH HAZARD MONITORING

BACKGROUND

People use handheld, mobile or other user transportable electronic devices for a variety of purposes, such as making telephone calls, texting, accessing the Internet, sending and receiving email, playing digital content, executing applications, playing games, navigation, and numerous other functions. Users of these devices sometimes use them while the users in motion, such as while walking, running, biking, skating, skiing, horseback riding, driving a car or other vehicle, and so forth, which can distract the users from their surrounding environment. Unfortunately, due at least in part to a lack of situational awareness, injury or death may occur if a user encounters a hazard when using a user transportable device while the user is moving.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
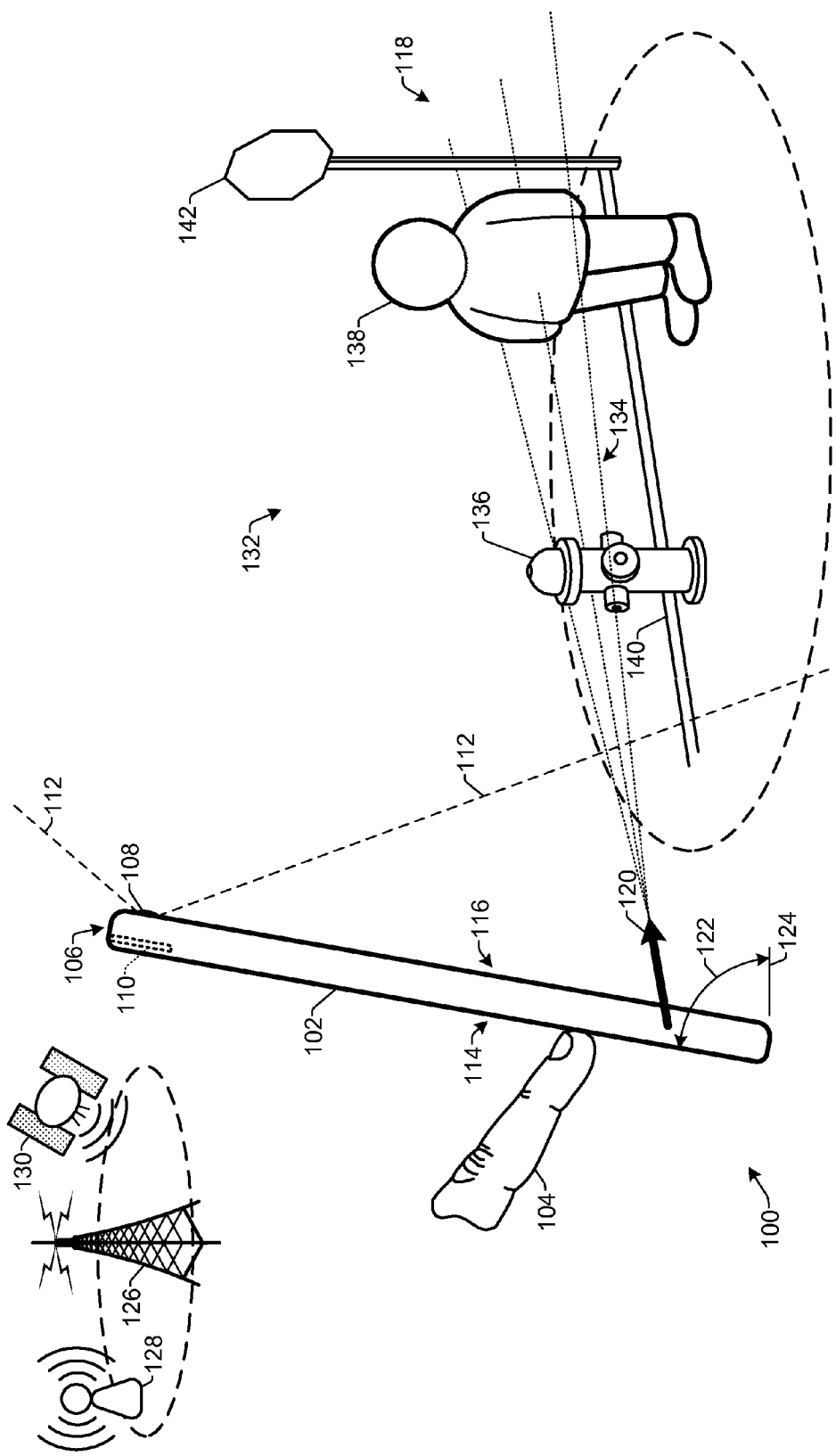
FIG. 1 illustrates an example user transportable device able to detect an object in a path of a user and provide an alert according to some implementations.

This disclosure includes techniques and arrangements for enabling a user transportable mobile electronic device to warn a user of a potential hazard. For instance, the user transportable device may determine that the user transportable device and the user are moving. The user transportable device may further determine that the user is using the user transportable device in a fashion such that the user may be distracted from the user's surroundings. As one example, the user may be using an application or function of the user transportable device that makes it likely that the user is looking at the display of the device, such as for performing text entry, looking at presented information or images, applying touch inputs, or the like. Thus, upon detecting movement of the user transportable device in a manner that indicates that the user is walking, running, driving, etc., the user transportable device may begin monitoring an area or region in front of the user, e.g., an area or region in a direction of travel of the user that includes a probable path of the user. In some instances, the user transportable device may attempt to identify any hazards in the direction of travel and/or the probable path of the user and warn the user if it appears likely that the user will encounter the hazard. Examples of such hazards may include potential collision with a person or other object in the user's path, detection of an upcoming curb, a set of stairs, an intersection, or any of numerous other possible obstructions or obstacles.

Some implementations may employ the ability of a user transportable device to detect when the device is in motion, and to make a determination that it is likely that the user is also in motion. For example, if the user transportable device detects that it is moving between 2-9 mph, this may be indicative that the user is walking, jogging or running. Further, a gait or a walking/running cadence of the user may be detected by one or more accelerometers on the user transportable device to provide further indication of walking/running as opposed to other types of motion, such as riding in a vehicle. Additionally, in some examples, the user transportable device may detect a current attitude or orientation of the device, such as based on inputs from one or more accelerometers or other suitable orientation sensors. For instance, if the device is held with the display facing substantially up and between an angle of about 0 to 90 degrees from the horizontal, then there is a strong probably that the device is being held in a position that enables the user to view the display.

In some examples, one or more cameras may be used by the user transportable device to provide information to the user regarding an area or region toward which the user is detected to be moving. In some cases, the device may determine a predicted path of travel of the user. Further, images from the camera may be analyzed and processed to recognize objects, obstructions, and other hazards. Additionally, in some cases, an auto-focusing ability of a camera and/or changes between sequential images may be used for determining the distance to objects in a predicted path of the user, the probability of a collision, and the like.

In some cases, some or all of the techniques herein may be invoked manually, such as by being turned on by the user at the beginning of a use session. In other examples, however, the provision of information and/or hazard monitoring may be invoked automatically. For instance, a hazard monitoring module may run as a background process until movement of the device is detected. Further, in some examples, the user may not be able to disable the hazard monitoring features, such as in the case of parental controls or extremely unsafe behavior (e.g., texting while driving at a high rate of speed). In addition, Global Positioning System (GPS) technology may be used to turn on some features automatically when the user enters certain areas and/or turn off some features in certain areas. For example, use of the camera may be prohibited in certain areas.

In some implementations, the device presents an image captured by the camera on the display of the device. This may be an image in a small window on the screen, or may be provided as an overlay or underlay to the whole screen, e.g., a translucent image, a partially transparent image or an alpha channel image, a background image, etc. As several examples, the image may be at least one of a partially transparent image overlaid on a user interface; an image displayed under a partially transparent user interface; only a portion of an image received from the camera; or an augmented image that visually distinguishes one or more objects in the image. For instance, when an object in the image has been determined to be a potential hazard, the image may be processed or augmented, such as by outlining or coloring potential hazards, or with other graphic effects. As one example, when an object in an image is first identified as a potential hazard, the object may be outlined in a first color, such as yellow. If the user continues to advance toward the object, such that an encounter with the object is imminent, the object may be outlined in a different color, such as red, the outline, object or image may flash rapidly, and/or one or more additional alerts may be provided to the user.

In some cases, the image is not provided on the display until the device detects that the user is likely to be in motion, such as walking, running, biking, riding in a vehicle, etc. For instance, if the device detects that the user is walking, and that the user is holding the device in a position to view the display and/or is actually using the device, such as by making touch inputs, using a keypad, etc., the device may initiate presentation of the image captured by the camera. Typically, in the case that the camera is forward facing in the direction of movement of the user, the image captured by the camera will include the probable path over which the user will travel. Accordingly, the user can view on the display any obstacles, objects, or other hazards in the path of the user while the user is looking at the display. When the user transportable device detects that the user has stopped moving, the image from the camera may no longer be presented on the display.

Additionally, in some examples, processing of the image may be performed to detect components or portions of the image that may indicate an obstacle or hazard in a direction of travel and/or a predicted path of the user. For example, computer vision techniques, such as image segmentation, pattern or object recognition, and other image processing may be applied to detect objects in an image, such as for distinguishing a trash receptacle from surrounding pavement or grass. Similarly, image processing may be used to detect a yellow/red/white curb or pedestrian crossing marks, which may indicate a transition from a safe sidewalk to a dangerous road. Stairs, fountains, bushes, street signs, fire hydrants, vehicles, walls, and any of numerous other objects can be detected by the device. Changes in object size from one image to a subsequent image may indicate an approaching pedestrian or vehicle. Additionally, sound received by the microphone can further indicate an approaching vehicle, such as an automobile, bus, or train, or other hazard. The user transportable device may further calculate a likelihood of collision or other encounter with an identified object or hazard based at least in part on a predicted path of the user. Additionally, in some examples, an auto-focus capability of the camera may be used to help determine a distance to a particular object. Accordingly, the probable distance to potential obstacles may be measured and compared with a predicted path of the user. For example, an overall predicted path of the user may be determined, such as based on changes in GPS position and other inputs to the user transportable device, and despite some movement of the device that may occur relative to the user or the user's path. In the case that an encounter with a hazard appears likely, the device may provide an alert to the user, such as a visual alert, an audible alert, a tactile or vibratory alert, or any combination thereof.

As another example, image processing may be applied to recognize that the user is driving a car. For example, the device may detect that the device is moving and the device may further recognize from a captured image a steering wheel or car dashboard. In such a case, the device may provide a warning or may even disable itself, at least in part, such as by deactivating one or more hardware components of the device, deactivating one or more executable modules, software components, etc., e.g., blacking out the display, deactivating a transceiver, displaying a warning screen, deactivating a module for sending or receiving text messages, or the like, until the device detects that it is no longer moving. For example, parental controls may include this feature to prevent teens from using mobile devices while driving. Alternatively, suppose that the user is a passenger in the car, then when the user transportable device detects that the device is moving, but the image obtained from the camera shows that the device is in the passenger seat or in a rear seat of the car, the device may take no additional action and may operate normally.

For discussion purposes, some example implementations are described in the environment of presenting an interface for alerting a user about a hazard. However, the implementations herein are not limited to the particular examples provided, and may be extended to other types of interface configurations, other types of alerts, and other types of user interactions, as will be apparent to those of skill in the art in light of the disclosure herein.

Example Device

FIG. 1 illustrates an example user transportable electronic device 100 able to present information related to content items according to some implementations. The user transportable device 100 may be implemented as any of a number of different types of electronic devices, such as a cellphone, a smart phone, a tablet computing device, an electronic book (eBook) reader device, a media player, a navigation device, a portable gaming device, or other typically handheld devices, and wearable devices or devices that are otherwise transported by a user, such as headphones, a helmet, augmented reality glasses, an article of clothing, a device retained in an armband or supported on a belt, a watch, a bracelet, an anklet, or any other user transportable mobile electronic device having components capable of performing the monitoring function described herein, and that may be carried by, worn by, or supported by a person.

The user transportable device 100 may include, or may have associated therewith, a display 102 to present information to a user. In some types of user transportable devices 100, the display 102 may be a touch-sensitive display configured with a sensor to sense a touch input received from an input effecter 104, such as a finger of a user, a stylus, or the like. Thus, the touch-sensitive display may receive one or more touch inputs, stylus inputs, selections of text, selections of interface components, and so forth.

In other implementations, the display 102 may be non-touch sensitive. Accordingly, in addition to, or as an alternative to, a touch sensitive display, the user transportable device 100 may include various external controls and input devices. For example, some implementations (not shown in FIG. 1) of the user transportable device 100 may include a virtual or physical keyboard or keypad, a mouse, a pointing stick, a touchpad, a trackball, a joystick, a remote control, buttons and/or various other controls for performing various desired inputs and interactions with the user transportable device 100, such as with an interface or other information presented on the display 102. Additionally, in some implementations, one or more voice commands may be used to control or interact with the interfaces and user transportable devices herein. Further, in some examples, a user's eye position or point of focus may be detected to serve as inputs or commands. Thus, implementations herein are not limited to any type of input devices, techniques, or controls.

In addition, in some examples the user transportable device 100 may include one or more cameras 106, which may be each be a mono or stereo camera, a camera array, or other suitable light detection device, such as an infrared (IR) energy detection device. Each camera 106 may include a lens 108 and an image sensor 110 to receive images taken from an angle of view or field of view 112 of the camera 106. Typically, the field of view 112 is dependent upon several factors, including lens size, aperture, zoom, image sensor size, and so forth. The image sensor 110 may be any suitable type of image sensor such as a CCD (charged-coupled device) or a CMOS (complementary metal-oxide-semiconductor) image sensor. Further, the image sensor 110 may be configured to receive and detect visible light, IR light, or any combination thereof.

In the illustrated example, the display 102 is located on a first side 114 of the user transportable device 100 and the camera 106 is oriented toward a second side 116 of the user transportable device 100, opposite to the first side 114. Thus, the camera 106 may be a forward-facing camera that is operable to obtain one or more images of a region 118 within the camera's field of view 108 on a side opposite to the display 102. Further, in some examples, a camera 106 may additionally, or alternatively, be oriented toward the first side 114 of the user transportable device 100, i.e., a rear-facing camera.

In the illustrated example, suppose that the user and the user transportable device 100 are moving in a direction of travel indicated by an arrow 120. The user transportable device 100 may detect that the device 100 is in motion using any of numerous techniques, sensors, and combinations thereof. For instance, the user transportable device 100 may include one or more accelerometers, a compass, a Global Positioning System (GPS) device, one or more communication interfaces, or various other sensors and components that may provide sensor information to the user transportable device 100 to indicate that the device is in motion. As one example, the user transportable device 100 may detect that the device 100 is currently being held with the display 102 facing up, at an angle 122 that is between about 0 and 90 degrees from a horizontal position or horizontal axis 124, which may correspond the ground in some cases. Such an angle 122 indicating the device's attitude or orientation may imply that the user is looking at the display 102 at least some of the time.

The user transportable device 100 may further detect that the user is walking based on detecting a gait or cadence movement of the user that may be detected, for example, using one or more accelerometers, i.e., movement of the device in an up and down, back and forth manner indicative of walking or running. The user transportable device 100 may further detect movement of the device 100 based on one or more inputs from one or more other components. For example, communication of the user transportable device 100 with one or more cell towers 126 and/or wireless access points 128 may change in nature, such as by the signal strength increasing or decreasing as the user is moving from one location to another. Further, GPS communications from one or more GPS satellites 130 may indicate movement of the user transportable device 100. As another option, the camera 106 may be operated to collect sequential images, which may be processed or analyzed to detect a change in a scene within the field of view 112 that is indicative of movement of the user transportable device 100 and the user.

The user transportable device 100 may use any combination of the inputs from the multiple different sensors, components and sources for detecting that the user transportable device 100 and the user are in motion. Further, the user transportable device 100 may allow some sensors, such as the accelerometers, to operate in the background, while other more power-thirsty sensors, such as the GPS device and the camera may remain off until some type of movement is detected by the sensors operating in the background. For instance, the accelerometers may provide sensor information that is indicative of a pattern of movement corresponding to walking or running. The device may then wake up the GPS device and/or the camera to begin monitoring movement of the device, and begin monitoring a region in the direction of travel of the device if the device 100 detects that the user is likely to be using the device while moving.

When the device 100 is in motion and being held in a manner or orientation to indicate that the display 102 is likely to be able to be viewed by the user, or if the device is actually being used, such as by receiving user inputs (e.g., text entry, touch inputs, etc.), the user transportable device 100 may operate the camera 106 to monitor the region 118 in the camera's field of view 112. For example, when the orientation of the display 102 (i.e., the presentation area or viewable portion of the display) is determined to be between 0 and 90 degrees from horizontal and facing away from the direction of travel, the display 102 is likely to be viewable by the user, and thus, the user may be looking at the display 102, rather than in the direction of travel. Additionally, if the device 100 is actually receiving user inputs while the device 100 is determined to be in the motion, this is also an indication that the device 100 is being used and that the user may not be looking in the direction of travel. For instance, if a user input is received within a threshold period of time before, during or after the device 100 is determined to be in motion, the device 100 may determine that the device 100 is being used while in motion.

The device 100 may begin operating the camera 106, which is oriented, at least in part, toward a direction of travel of the user transportable device 100. The camera 106 may receive an image of a scene including one or more objects 132 in the region 118 in a path 134 of the user. In the illustrated example, the objects 132 include a fire hydrant 136, a person 138, a curb 140 and a street sign 142, although in other examples, any other object that may be a hazard can be detected by the device 100. As the user transportable device 100 moves in the direction of travel indicated by the arrow 120, the scene imaged by the camera 106 will change from one image to the next as the objects 132 become closer to the user transportable device 100 or otherwise change position in relation to the device 100. Additionally, in some cases, the user transportable device 100 may predict a path 134 of the user based on the information from the sensors and/or the changes in multiple images obtained from the camera 106. In some examples, the user transportable device 100 may include an image processing module that employs computer vision and pattern recognition techniques to distinguish objects 132 in a received image and to identify objects that may pose a hazard to the user of the user transportable device 100. For example, as the scene imaged by the camera 106 changes from one image to the next over a period of time, the image processing module and/or a hazard recognition module may determine, based on the predicted path 134, that the user transportable device 100 is approaching a particular object 132 and may be on a collision course or may otherwise encounter the particular object 132.

In some situations, when the user transportable device 100 is monitoring the region 118 and determines that there may be an obstacle, such as an object 132 that poses a likelihood of collision or other hazard to the user of the user transportable device 100, the device 100 may provide a warning, alert, or other notification to the user regarding the presence of the hazard. For instance, the user transportable device 100 may provide any combination of a visual alert, an audible alert, a tactile or haptic alert, and so forth. On the other hand, when the user transportable device 100 detects that the device 100 is no longer in motion, or is no longer being used in a manner that may be distracting to the user, the user transportable device 100 may cease monitoring of the region 118 in order to conserve power of the device 100. For example, if the user holds the user transportable device 100 downward, to one side, or places the user transportable device 100 into a pocket, the user transportable device 100 may determine this action, and may turn off the camera 106 and otherwise stop monitoring for hazards.

Example Interfaces

Figure 2:
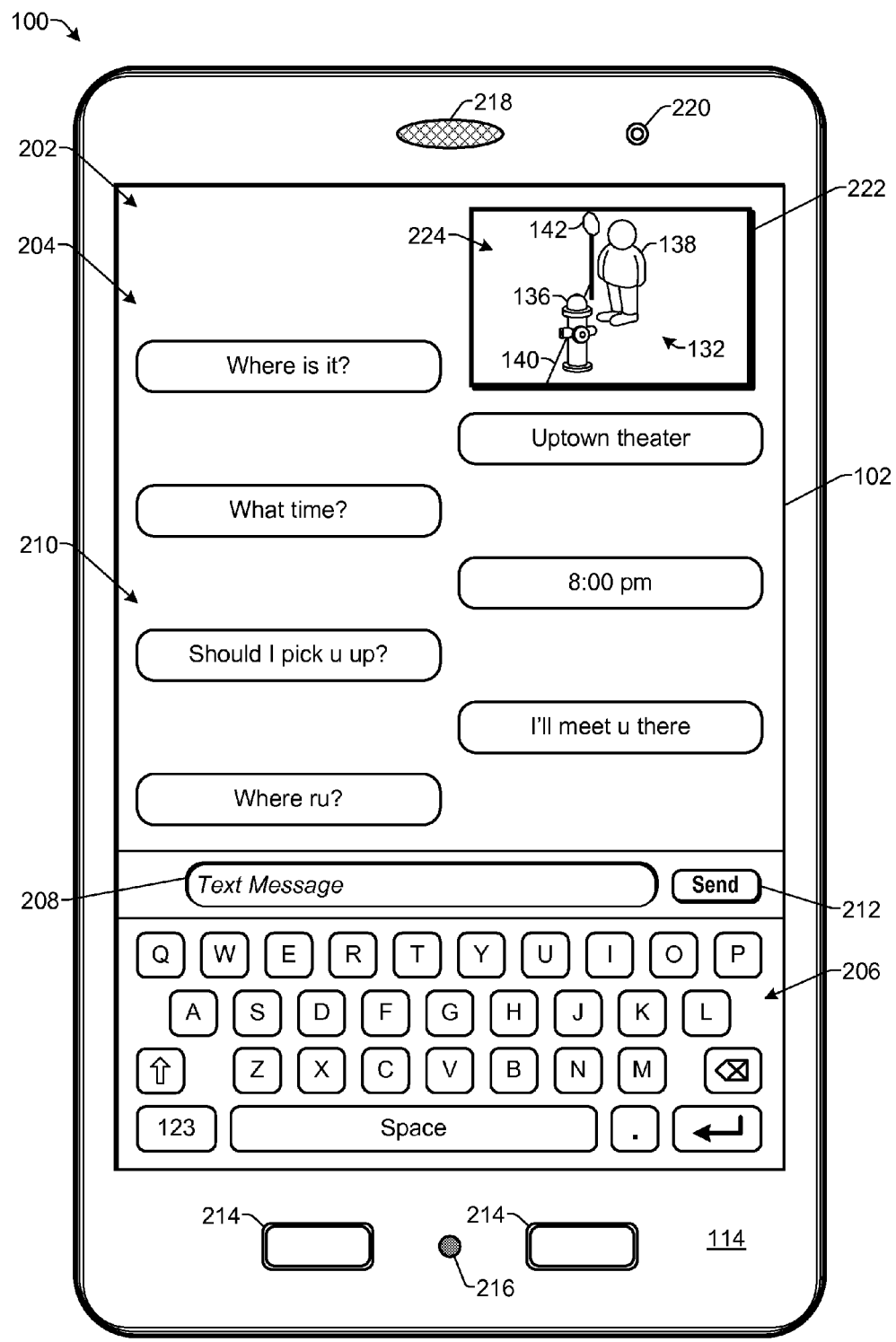
FIG. 2 illustrates an example interface to provide a user with information regarding an object in the user's path according to some implementations.

FIG. 2 illustrates an example of presenting information related to an object in a path of a user according to some implementations. As mentioned above, the user transportable device 100 includes the display 102, which may present an image or other information 202 to a user. In this example, the presented information 202 includes a user interface 204 for sending and receiving text messages. In other examples, any other type of information 202 may be presented on the display 102, such as text, images, video, or the like. As several examples, the display 102 may present an interface for making phone calls; an interface for sending and receiving emails; an interface provided by one or more applications executing on the user transportable device 100; an interface for a web browser or other application for accessing the Internet; an interface for presenting digital content, such as an eBook, a video recording, or an audio recording; an interface for presenting a map or navigation information; an interface of an operating system, and numerous other interfaces or other types of information, images, etc.

In the illustrated example, the texting interface 204 includes a virtual keyboard 206, a message entry area 208, an old messages area 210, and a send button 212. Further, in this example, the user transportable device 100 includes various other components, such as one or more physical buttons or controls 214, one or more microphones 216, at least one speaker 218, and a front-facing camera 220, which may be one of the one or more cameras 106 described above.

The display may further present a monitoring interface 222 that may include an image received by the front-facing camera 106 on the second side 116 of the user transportable device 100. In some examples, the monitoring interface 222 may be automatically activated when certain conditions are detected by the user transportable device 100. For example, when the user transportable device 100 is not determined to be in motion, then the monitoring interface 222 is not presented. On the other hand, when the device is detected to be in motion as discussed above, and is being held at an orientation that indicates the user may be able to view the display 102 while moving, or the user is actually interacting with the device 100, such as by making one or more touch inputs, then the user transportable device 100 may automatically start monitoring for hazards in a direction of travel, such as a predicted path of the user, and may further present the monitoring interface 222 as a pop-up, overlay, etc., on the display 102. Accordingly, the monitoring interface 222 may provide at least a portion of an image obtained by the camera 106 as a displayed scene 224. Thus, referring to the example of FIG. 1, the scene 224 may include the object 132, which in this case is a person located in the predicted path 134 of the user. Thus, the user may be able to view, directly on the display 102, any hazards in the path 134 of the user without having to look up from the display 102.

In some examples, an operating system of the user transportable device may generate the monitoring interface 222 and display the monitoring interface 222 over top of another interface such as the interface 204 produced by a separate application or module. As several examples, the monitoring interface 222 and any associated graphic effects, may be generated using any of HTML (hypertext markup language), JavaScript®, CSS (Cascading Style Sheets), widgets, C, C+, Java®, or any combination thereof, or any other suitable technology, programming language, or graphics rendering software. For instance, the operating system of the device 100 may include one or more modules that run as background processes to monitor the use of the device, detect whether the device is in motion, and so forth. When the conditions described above are detected, the one or more modules may become more active, such as by activating the camera to capture one or more images, and processing the one or more images to detect whether any hazards are in a predicted path of the user. The GPS device may also be utilized for tracking movement of the device.

In other examples, the monitoring interface 222 may be generated by the application that is generating the current interface 204. For instance, the texting interface 204 may include one or more APIs (application programming interfaces) able to receive an image captured by the camera 106 and present the image in a pop-up or picture-in-picture window as the monitoring interface 222. Accordingly, in this implementation, certain interfaces, applications and programs that a user tends to use in a dangerous manner, such as while walking, running, etc., may include the capability to present the monitoring interface 222.

As still another example, the monitoring interface 222 may be generated by a separate application that executes on the user transportable device 100. For example, the monitoring interface 222 may be generated by a monitoring application that may start when the user turns on the user transportable device 100, and that runs as a background operation until one or more conditions indicate that the device 100 is being used while in motion in a manner that may be distracting or dangerous to the user. Accordingly, upon detecting these conditions, the monitoring application may then become more active, and may present the monitoring interface 222 as an overlay on top of the interfaces of any other currently executing applications. Other variations will also be apparent to those of skill in the art having the benefit of the disclosure herein.

Figure 3:
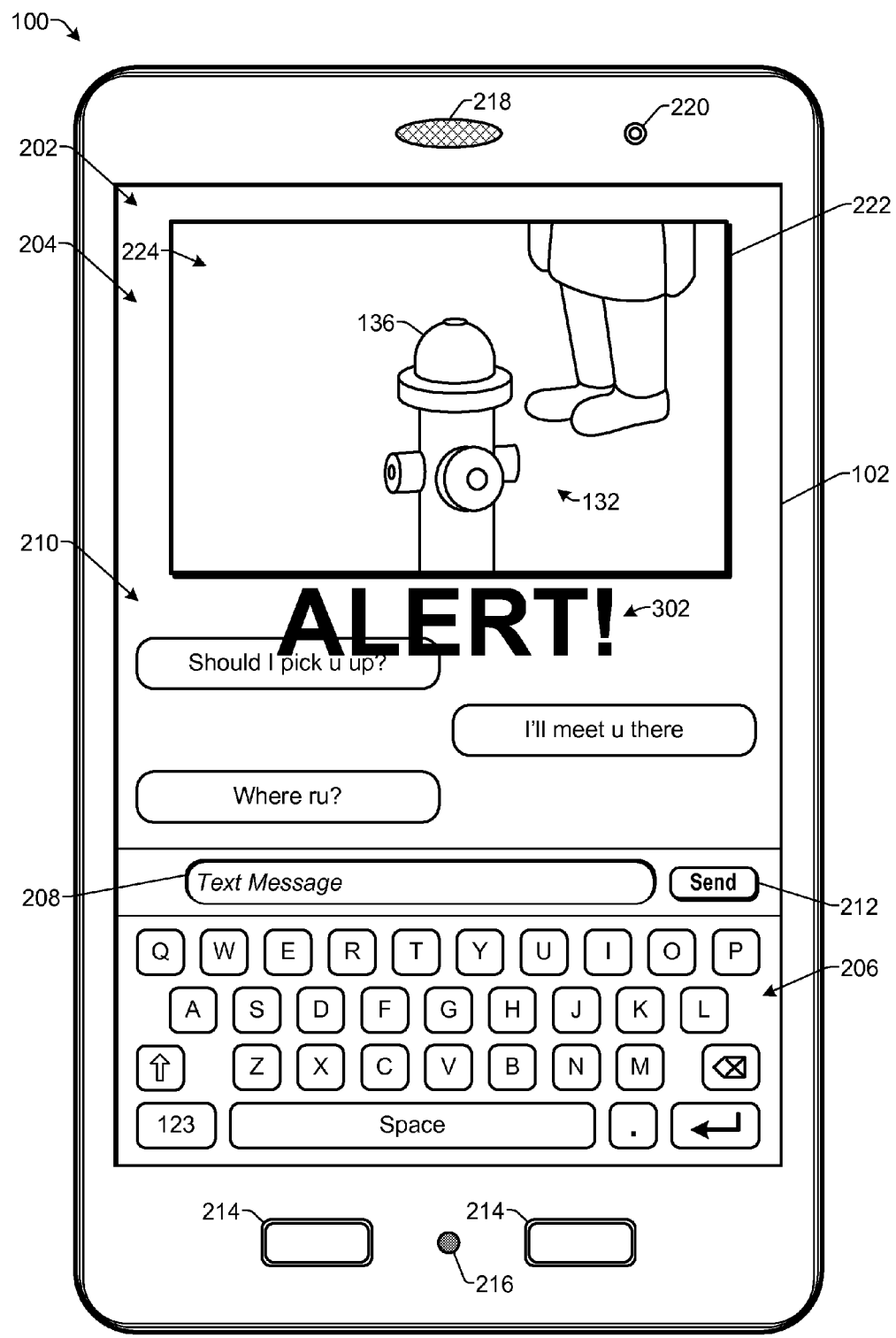
FIG. 3 illustrates an example interface to provide a user with an alert regarding a hazard according to some implementations.

FIG. 3 illustrates an example of presenting information related to a hazard in a path of a user according to some implementations. For example, suppose that, despite having the monitoring interface 222 present the image of the region in the direction of travel of the user, the user continues to move directly toward the object 132, i.e., the fire hydrant 136, which is now considered a hazard. When the user transportable device 100 predicts that an encounter with the fire hydrant 136 is imminent, the user transportable device 100 may provide a warning or alert to the user. For instance, the user transportable device 100 may increase the size of the monitoring interface 222, such as to draw the user's attention to the imminent hazard. As another example, the user transportable device 100 may flash an alert 302 on the display 102, such as by overlaying one or more words on the display, flashing the display, darkening the display, or the like. Furthermore, the user transportable device 100 may issue at audible warning such as generating one or more noises, sounds, words, sirens, beeps, and so forth. Additionally, or alternatively, the user transportable device 100 may issue a tactile warning such as by using one or more haptic devices to vibrate or otherwise provide a tactile alert to the user.

When the user transportable device 100 detects that the user has stopped, or changed the path of the user to avoid the fire hydrant 136, the device 100 may return the monitoring interface 222 to its previous size and cease the visual alert 302 and/or the audible alert and/or the tactile alert. Alternatively, in the case that the user has stopped altogether, the user transportable device 100 may no longer display the monitoring interface 222 and may cease all alerts.

Example Framework

Figure 4:
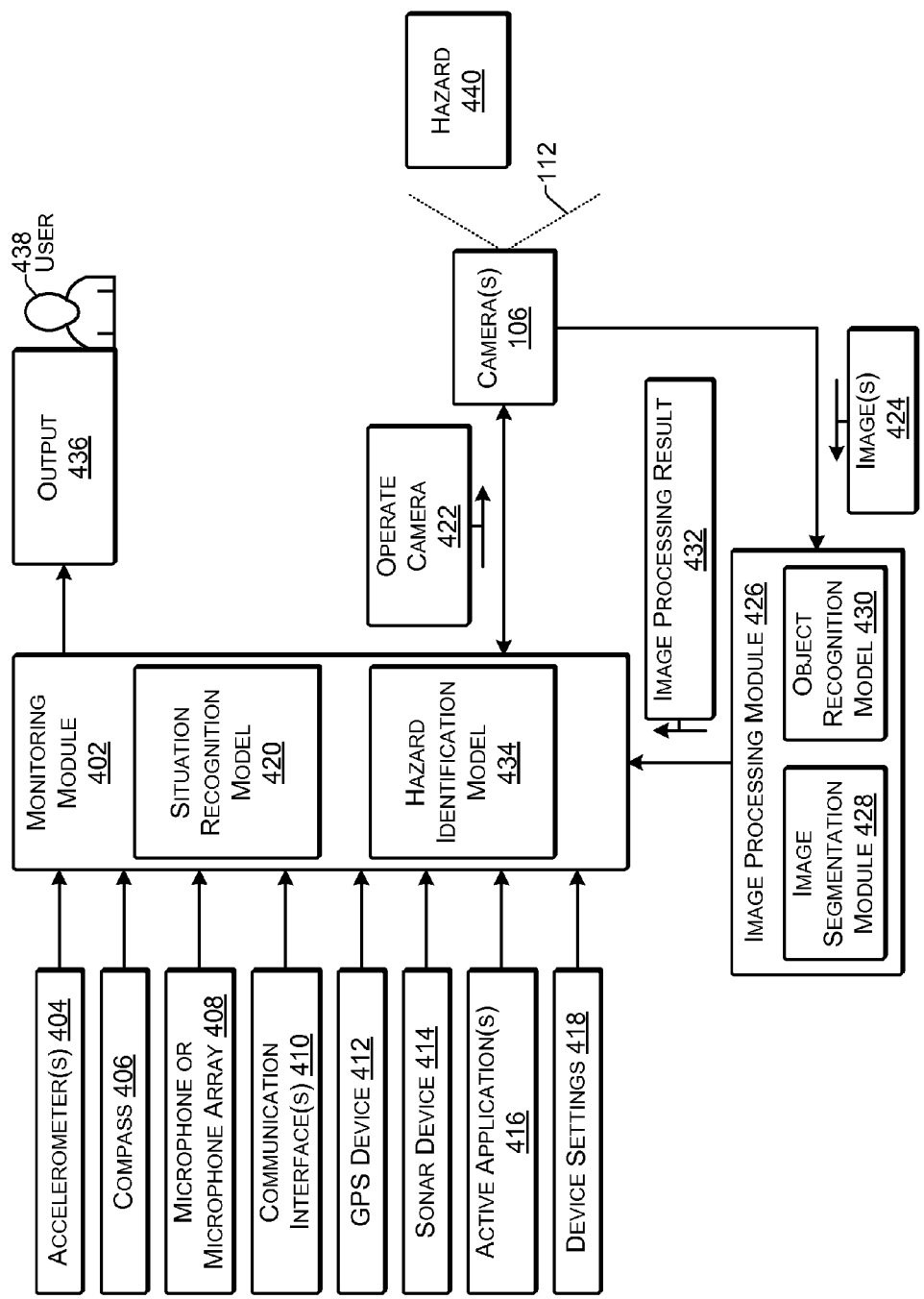
FIG. 4 illustrates an example framework for monitoring a user's environment with respect to use of a user transportable device according to some implementations.

FIG. 4 illustrates an example framework for performing hazard monitoring on the user transportable device 100 according to some implementations. In this example, the user transportable device 100 may include a monitoring module 402 that may be executed on the user transportable device 100. The monitoring module 402 may receive information from a plurality of sensors, components, and sources of information (hereinafter "sensors"). For example, the monitoring module 402 may receive input from one or more accelerometers 404, a compass 406, a microphone or microphone array 408, one or more communication interfaces 410, a GPS device 412, a sonar device 414, and so forth. For example, the accelerometers 404 can be monitored in the background to check for initial motion that is indicative of sustained movement of the device 100 and the user. The GPS device may also detect sustained movement, a direction of travel, and so forth. In addition, changes in a series of images captured by the camera 106 can also indicate sustained motion in direction of travel. Various different types of motion, such as gaits, that indicate movement of the user can be detected by the accelerometers, such as during walking, jogging, running, and so forth. Changes in images collected by the camera 106 can also be indicative of various types of motion, activities, and the like.

The compass 406 may further indicate motion based on a change in direction of the device 100. The microphone or microphone array 408 may detect noises that indicate a hazard, or that contribute to detection of a hazard, such a traffic noise, approaching sirens, electric vehicle signature noises, fountain noises, mass transit or train arrival noises, to name a few. The communication interfaces can indicate a change in signal strength from a cell tower, wireless access point, or the like. The GPS device 412 can detect movement of the device from a first location to a second location. In some examples, the GPS device 412 may be activated only periodically unless movement of the device 100 has been detected, in which case the GPS device may begin monitoring the direction of travel, velocity of travel, etc. The sonar device 414 can emit an audible or inaudible noise, such as in a periodic manner, to detect any objects in a path of the user. Furthermore, the monitoring module 402 may identify one or more active applications 416 that are currently active on the device 100 such as being used currently by a user of the device, or currently displaying an interface on the display 102. In addition, the monitoring module 402 may receive or may access device settings 416 that may specify one or more settings such as user preferences for when the monitoring module 402 displays the monitoring interface 222, and so forth.

The monitoring module 402 may include a situation recognition model 420, which may be a trained statistical model that receives the information from the sensors and other sources, and that determines whether the device 100 is in motion such as being carried by a user who is walking, jogging, running, biking, skating, skiing, horseback riding, driving a car or other vehicle, or the like. As mentioned above, the monitoring module 402 may run as a background process and may provide information from one or more of the sensors or sources to the situation recognition model 420, as the information is received. For instance, the GPS device 412 and the camera 106 may normally be in a powered down condition to conserve a power supply, such as a battery, of the user transportable device 100. Subsequently, if the monitoring module 402 receives input from the one or more accelerometers 404, which is determined by the situation recognition model 420 to be indicative that the user is walking or running, the monitoring module 402 may activate the GPS device 412 to determine a speed of the user. Various other inputs may also be used to determine movement of the user, such as input from the communication interfaces 410. For instance, when the user moves from one location to another, the signal from a wireless access point or a cell tower may change in a manner that can be identified by the situation recognition model 420 as being indicative of movement of the user.

Furthermore, information from the accelerometers 404 and/or from other inputs or sources may indicate a current attitude or angle of the user transportable device 100 with respect to the ground or other horizontal axis. In addition, the active application(s) 416 on the device 100 may indicate that the monitoring module 402 may start operating the camera 106 to monitor a potential path of the user. For instance, if the active interface or application 416 is a type in which the user views or interacts with the display 102 of the device 100, and the accelerometers 404 indicate that the device 100 is currently being held at an attitude at which the user is able to view the display 102, and the situation recognition model 420 indicates that the user is likely to be moving (e.g., within a confidence level), then the monitoring module may begin to operate the camera, as indicated at 422, to monitor an area or region that includes a predicted path of the user, e.g., within the field of view 112 of the camera 106.

The camera 106 may capture or obtain one or more images 424, which may be provided to an image processing module 426. The images 424 discussed herein may be in any suitable electronic image format, such as TIFF (Tagged Image File Format), JPEG (Joint Photographic Experts Group), BMP (Bitmap), GIF (Graphics Interchange Format), PNG (Portable Network Graphics), Exif (Exchangeable image file format), RAW, and so forth. Thus, the disclosure herein is not limited by the image file format. In some examples, a single image 424 may be obtained, while in other examples, a sequence of images may be obtained. For instance, multiple frames per second may be obtained and the images compared with one another to determine changes in the position of objects identified in the images, which can assist in identification of objects that may pose a hazard to the user, a distance to the objects, and so forth.

The image processing module 426 may carry out computer vision processing of the captured image 424 to attempt to determine any objects or hazards in the predicted path of the user. As one example, the image processing module may include or may access an image segmentation module 428 that may be used to segment the image into components, such as connected components made up of connected pixels that share one or more pixel properties. Various types of image segmentation may include thresholding, clustering, connected component analysis, edge detection, region growing, split and merge methods, graph partitioning methods, model-based segmentation, and trainable segmentation.

After the image 424 has been segmented, an object recognition model 430 may be applied to attempt to identify one or more objects included in the image 424. For example, the object recognition model 430 may be a trained statistical model that has been trained using a large number of training images including recognizable objects and may use pattern recognition techniques for identifying objects in the image

424. Examples of suitable pattern recognition models or classifiers that may be used include logistic regression classifiers, support vector machines, quadratic classifiers, linear classifiers, kernel estimation classifiers, neural networks, Bayesian networks, hidden Markov models, decision tree classifiers, and so forth. Further, implementations are not limited to any particular type of model or classifier, and thus may employ any combination of algorithms, learning models, statistical models, feature vectors, and so forth, that receive one or more inputs, and categorize, group, cluster, organize, or otherwise classify the one or more inputs into one or more sets, categories, groups, clusters, or the like, such as based on one or more quantifiable properties or features of the one or more inputs. Accordingly, the object recognition model 430 may receive the segmented image and identify one or more objects included in the image 424.

An image processing result 432 may be provided to the monitoring module 402. For example, the image processing result 432 may identify one or more objects included in the image 424. The monitoring module 402 (or the image processing module 426) may include a hazard identification model 434 that may receive the image processing result 432 as well as information from the sensors for attempting to identify whether there may be a hazard in the predicted or probably path of travel of the user. For instance, the hazard identification model 434 may be a trained statistical model, such as discussed above, that receives information from sensors including the compass 406, the microphone 408, the accelerometers 404, the communication interfaces 410, and the GPS device 412 for determining a predicted path of travel of the user, a speed of travel of the user, and so forth. Further, the hazard identification model 434 may determine whether there is a hazard in the predicted path of the user such as based on the image processing result 432. For example, the hazard identification model can predict a likelihood of a collision or other encounter with one or more of the objects recognized by the object recognition model 430. For example, if the image(s) show that a user 438 is approaching a yellow/red/white curb, the edge of a subway platform, pedestrian crossing marks, an open manhole cover, or the like, which may indicate a possible hazard, the hazard identification model can be trained to provide an output, such as an alert to the user. In some cases, when a particular type of object reaches a particular size in the image(s), the device may issue an alert based on the assumption that the object is in the user's path and an encounter is imminent. In other cases, the hazard identification model 434 may determine a likely probable path of the user, such as based on compass information, averaged image information, GPS information, and so forth, and consider which objects in the image are likely to be a hazard to the user. The hazard identification model 434 can provide an output 436 to the user 438 based on whether a hazard 440 is identified in the predicted path of the user 438. For example, if it appears imminent that the user 438 will encounter the hazard 440, the output 436 may be an alert to the user as discussed above.

Example System

Figure 5:
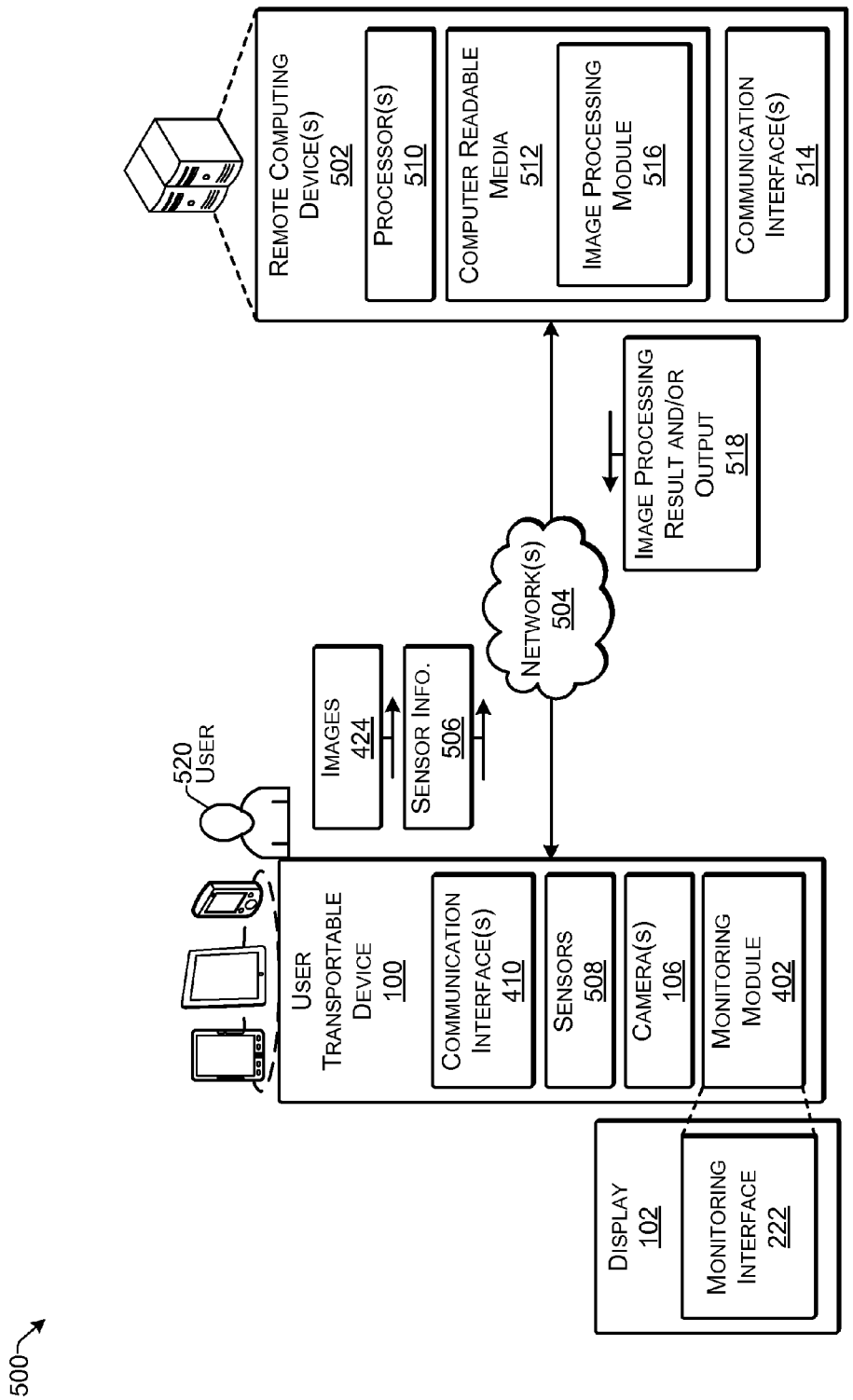
FIG. 5 illustrates an example system for monitoring a user's environment with respect to use of a user transportable device according to some implementations.

FIG. 5 illustrates an example system 500 that may be employed to offload a portion of the processing from the user transportable device 100 to one or more remote computing devices 502 according to some implementations. The remote computing device(s) 502 may be provided by a service provider, such as an entity that provides a cloud-based service to the user transportable electronic device 100. In this example, the user transportable device 100 may be able to communicate with one or more remote computing devices 502 through one or more networks 504. For example, the network(s) 504 may include a local area network (LAN), a wide area network (WAN), such as the Internet, or any combination thereof, and may include both wired and wireless communication technologies, including cellular communication technologies. The remote computing device 502 and the user transportable device 100 may communicate and interact with one another using any combination of suitable communication and networking protocols, such as Internet protocol (IP), transmission control protocol (TCP), hypertext transfer protocol (HTTP), cellular communication protocols, and so forth.

For example, if the network connection of the user transportable device 100 to the remote computing device 502 is sufficiently fast, it may be more economical to allow the remote computing device 502 to perform the image processing and/or the hazard recognition. For example, image processing may be a processor intensive operation and thus, by sending one or more images 424 and/or sensor information 506 from one or more sensors 508 to a remote computing device 502, the user transportable device 100 may conserve power and avoid processor intensive use of resources. Accordingly, the remote computing device(s) 502 may provide one or more computing services to the user transportable device 100.

In the illustrated example, each remote computing device 502 may include one or more processors 510, one or more computer readable media 512, and one or more communication interfaces 514. The processor(s) 510 may be a single processing unit or a number of processing units, and may include single or multiple computing units or multiple processing cores. The processor(s) 510 can be configured to fetch and execute computer-readable instructions stored in the computer-readable media 512 or other computer-readable media.

The computer-readable media 512 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 502, the computer-readable media 512 may be a type of computer-readable storage media and may be a tangible non-transitory storage media.

The communication interface(s) 514 may include one or more interfaces and hardware components for enabling communication with various other devices, such as the user transportable device 100, over the network(s) 504. For example, communication interface(s) 504 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 504 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

In some examples, the remote computing device 502 may include an image processing module 516, which may perform image processing of one or more images 424 received from the user transportable device 100 in place of and in a manner similar to the image processing module 426 discussed above with respect to FIG. 4. For example, the image processing module 516 may include the image segmentation module and the object recognition model, as discussed above.

Further, in some examples, the remote computing device 502 may also execute a hazard identification module in place of and similar to the hazard identification model 434 discussed above, to further save processing resources and/or power on the user transportable device 100. Thus, the user transportable device 100 may send sensor information 506 to the remote computing device 502 over the network(s) 504 to enable processing by the hazard identification module as well. Further, since the trainable models, such as the object recognition model and the hazard identification model are maintained on a remote server in this example, these models may be updated on the remote computing device 502, without having to update the models on each individual user transportable device 100.

Example User transportable Device

Figure 6:
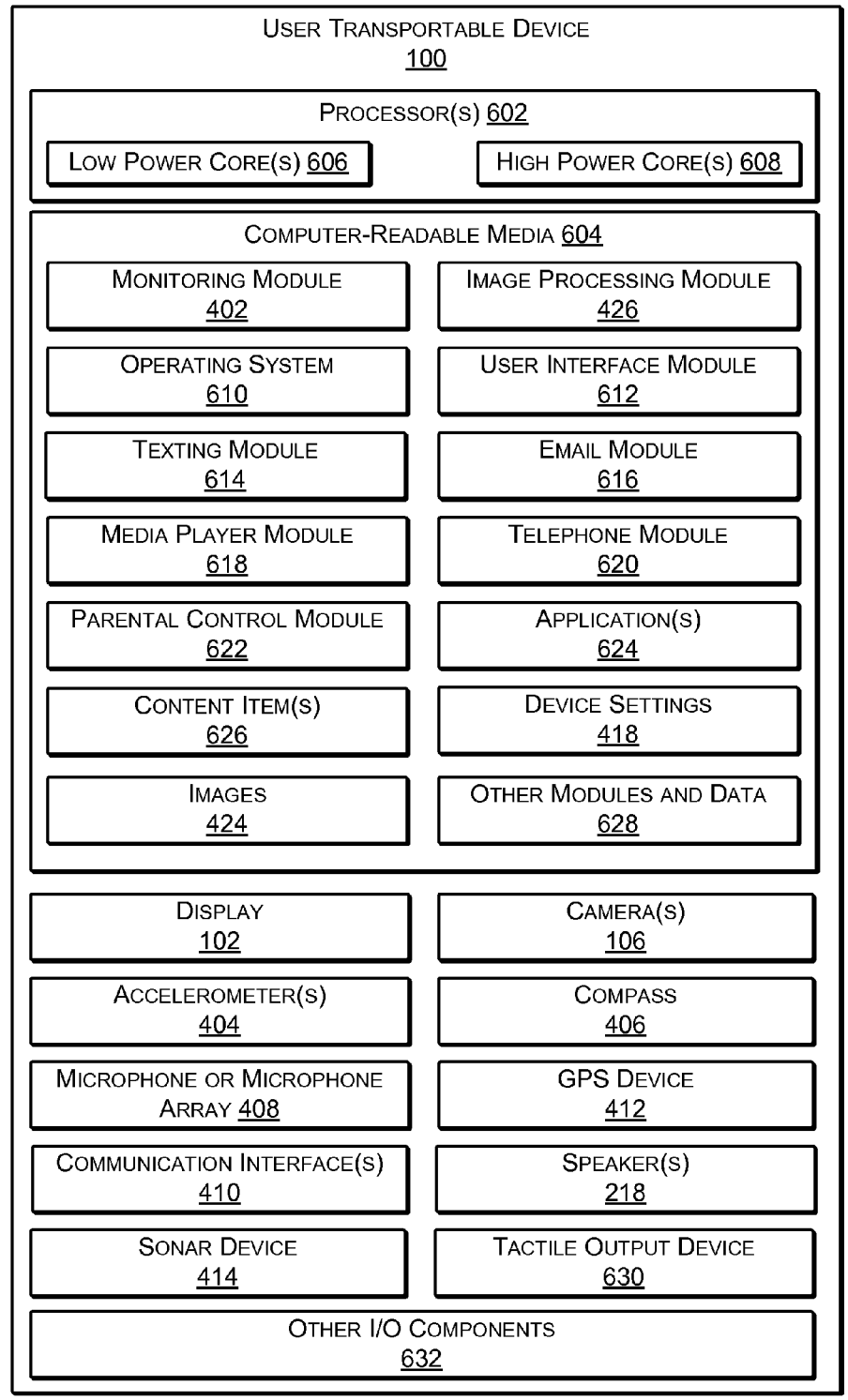
FIG. 6 illustrates select components of an example user transportable device according to some implementations.

FIG. 6 illustrates select example components of the user transportable device 100 that may be used to implement the functionality described above according to some implementations. In a very basic configuration, the user transportable device 100 includes, or accesses, components such as at least one control logic circuit, central processing unit, or processor 602 and one or more computer-readable media 604. Each processor 602 may itself comprise one or more processors or processing cores. In the illustrated example, the processor 602 may include one or more low power cores 606 and one or more high power cores 608. For instance, the monitoring module 402 may run in the background using the low power core 606 until such a time as movement of the device 100 and the other factors discussed above indicate that the user and the device are likely to be in motion. Some activities of the monitoring module 402 may then be performed by the high power core 606, such as capturing one or more images and performing image processing and hazard recognition with the one or more images to monitor for hazards in the path of the user. Further, as mentioned above, in some examples, the processing of the images and/or hazard recognition may be performed in the cloud, such as on a remote computing device 502, in which case fewer processing and memory resources of the user transportable device 100 will be utilized.

Depending on the configuration of the user transportable device 100, the computer-readable media 604 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the user transportable device 100 may access external storage, such as RAID storage systems, storage arrays, network attached storage, storage area networks, cloud storage, or any other medium that can be used to store information and that can be accessed by the processor 602 directly or through another computing device or network. Accordingly, the computer-readable media 604 may be computer storage media able to store instructions, modules or components that may be executed by the processor 602.

The computer-readable media 604 may be used to store and maintain any number of functional components that are executable by the processor 602. In some implementations, these functional components comprise instructions or programs that are executable by the processor 602 and that, when executed, implement operational logic for performing the actions attributed above to the user transportable device 100. Functional components of the user transportable device 100 stored in the computer-readable media 604 may include the monitoring module 402, executable by the processor 602 for detecting movement of the user transportable device 100 and monitoring for hazards in a predicted path of a user, as discussed above. Additional functional components stored in the computer-readable media 604 may include the image processing module 426, as described above, which may be executed by the processor 602 for segmenting an image and recognizing objects in the image. Other functional components may include an operating system 610 and a user interface module 612 for controlling and managing various functions of the user transportable device 100 and providing basic functionality. Additional modules may include a texting module 614 for sending and receiving text messages; an email module 616 for sending and receiving emails; a media player module 618 for playing and presenting digital content items; a telephone module 620 for making telephone calls; and a parental control module 622 for enabling parental control to be exerted over the device 100, such as for preventing use of certain functions of the device when movement of the device 100 is detected, or if it is determined that the user is driving a vehicle. Any or all of the modules 402, 426 and 612-622 may be integrated into the operating system 610, or may be operable separately therefrom. Additionally, the computer readable media 604 may include one or more applications 624, such as one or more mobile applications that may be executed to employ the device 100 to perform various functions and uses.

In addition, the computer-readable media 604 may also store data, data structures and the like, that are used by the functional components. For example, data stored by the computer-readable media 604 may include the one or more content items 626 that may be presented by the media player module 618. In some examples, the user transportable device 100 may further include the user or device settings 418, which may control operation of the monitoring module, such as when the monitoring module operates, what types of alerts are provided, and so forth. In some examples, the one or more images 424 are stored in the computer-readable media 604, at least temporarily, during image processing. The user transportable device 100 may also maintain other data, which may include, for example, data used by the monitoring module 402, data used by the operating system 610, and data used by the other modules described above. Depending on the type of the user transportable device 100, the computer-readable media 604 may also optionally include other functional components and data, such as other modules and data 628, which may include applications, programs, drivers and so forth, and the data used by the functional components. Further, the user transportable device 100 may include many other logical, programmatic and physical components, of which those described are merely examples that are related to the discussion herein.

Further, while the figures illustrate the functional components and data of the user transportable device 100 as being present on the user transportable device and executed by the processor(s) 602 on the user transportable device 100, it is to be appreciated that these components and/or data may be distributed across different computing devices and locations in any manner. For example, some or all of the various functionality described above for the image processing module 426 and/or the monitoring module 402 may distributed in various ways across different computing devices. For instance, the images 424 captured by the camera 106 may be sent to a remote server, and processor-intensive computer vision operations, such as scene segmentation, object recognition, hazard recognition, and other image processing and computer modeling techniques may be performed at the remote server, with an image processing result and/or an output or alert being returned to the monitoring module 402 on the user transportable device 100.

FIG. 6 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interfaces herein may be rendered in 3D.

Other components included in the user transportable device 100 may include one of more cameras 106 and various types of sensors, which may include the one or more accelerometers 404, the compass 406, the microphone 408, the GPS device 412 and the sonar device 414. The one or more communication interfaces 410 may support both wired and wireless connection to various networks, such as cellular networks, radio, WiFi networks, short-range or near-field networks (e.g., Bluetooth®), infrared signals, local area networks, wide area networks, the Internet, and so forth. The communication interfaces 410 may further allow a user to access storage on another device, such as a remote computing device, a network attached storage device, cloud storage, or the like.

The user transportable device 100 may further be equipped with various other input/output (I/O) components 616. Such I/O components may include a touchscreen and various user controls (e.g., buttons, a joystick, a keyboard, a keypad, etc.), one or more speakers 218, a haptic or tactile output device 630, connection ports, and so forth. For example, the operating system 606 of the user transportable device 100 may include suitable drivers configured to accept input from a keypad, keyboard, or other user controls and devices included as the I/O components 616. For instance, the user controls may include page turning buttons, navigational keys, a power on/off button, selection keys, and so on. Additionally, the user transportable device 100 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 7:
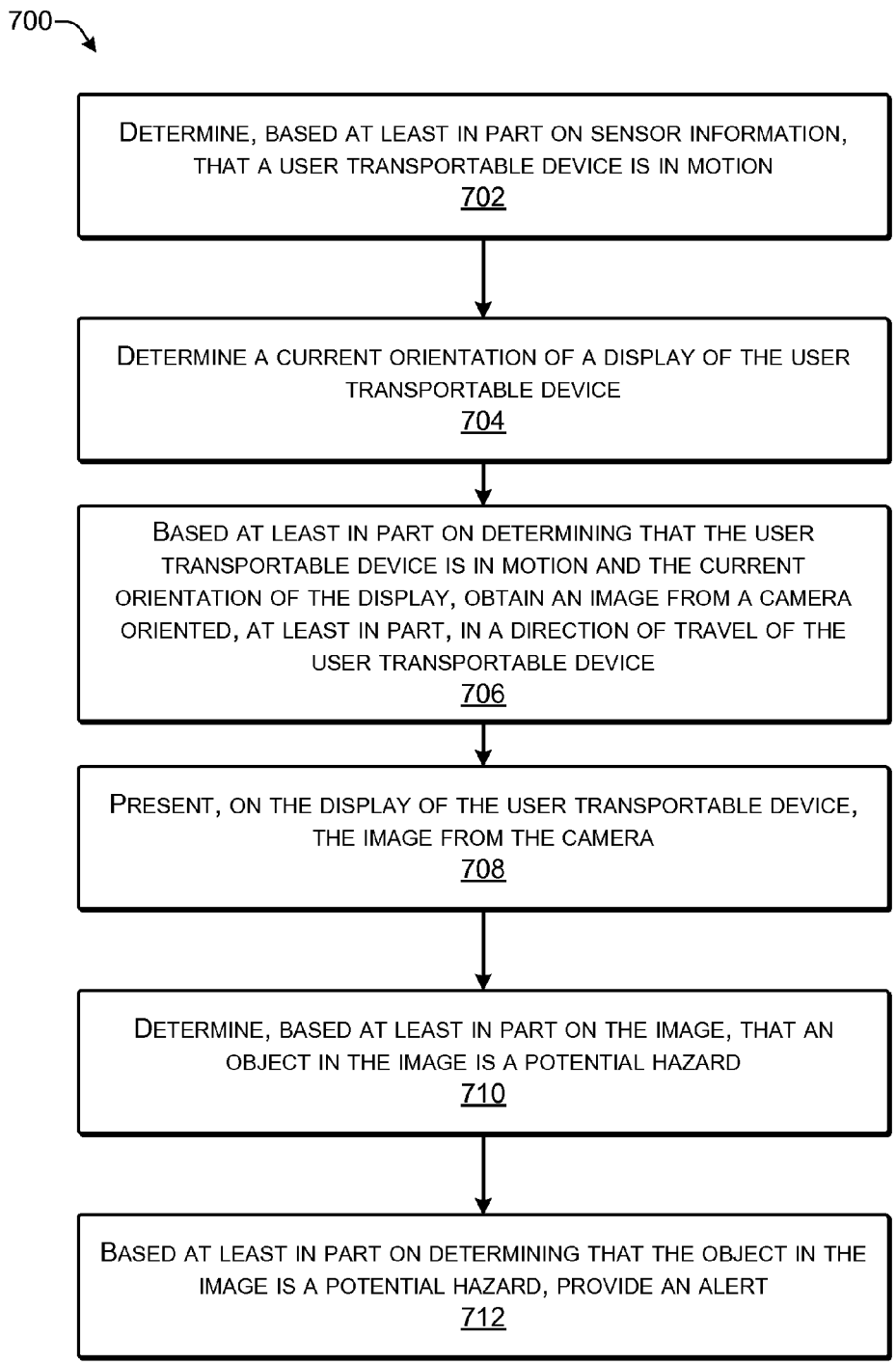
FIG. 7 is a flow diagram illustrating an example process that may be executed, at least in part, by a user transportable device according to some implementations.
Figure 8:
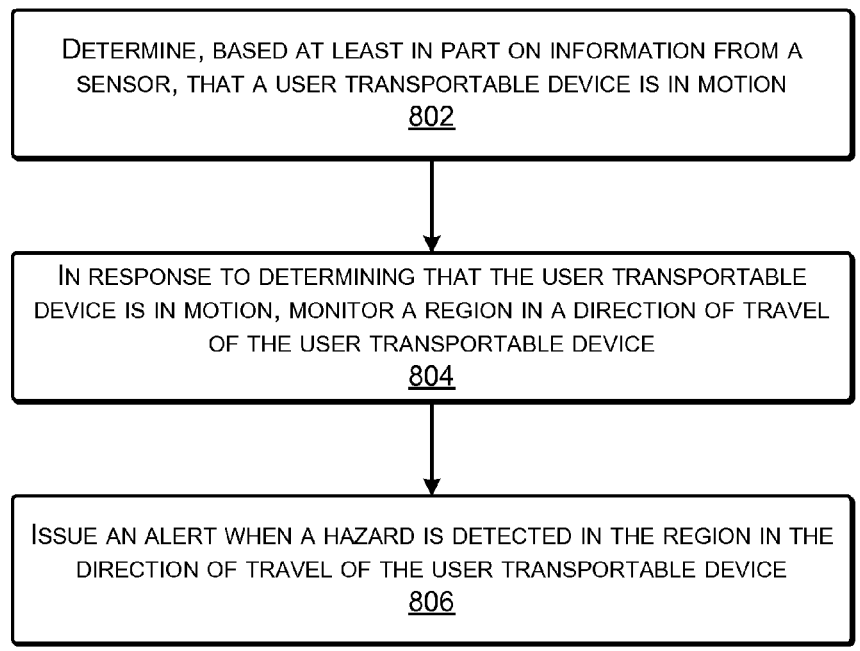
FIG. 8 is a flow diagram illustrating an example process that may be executed, at least in part, by a user transportable device according to some implementations.
Figure 9:
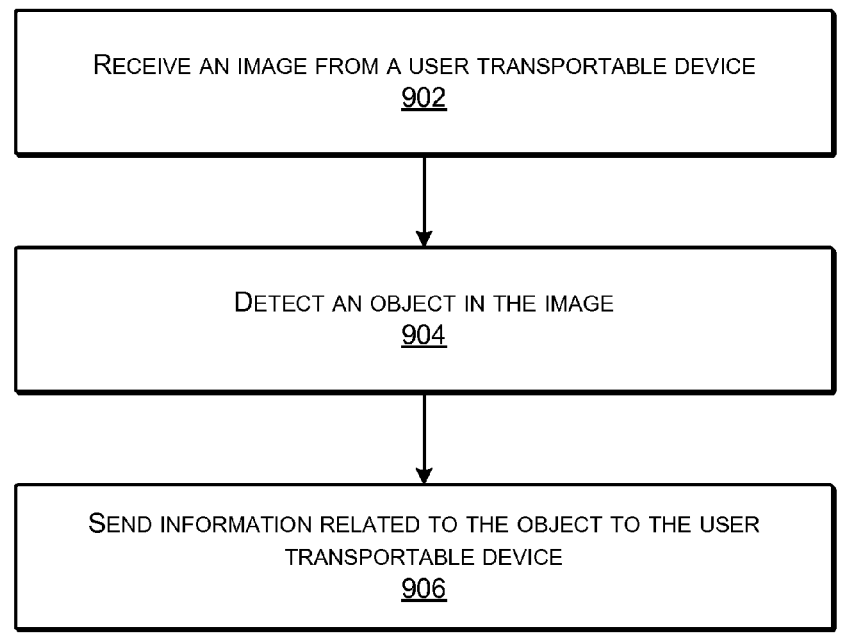
FIG. 9 is a flow diagram illustrating an example process that may be executed by a remote computing device according to some implementations.

FIGS. 7-9 illustrate example processes for providing hazard monitoring on a user transportable device according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 7 is a flow diagram illustrating an example process 700 that may be executed, at least in part, by a user transportable device according to some implementations.

At 702, the device, based at least in part on sensor information, determines that the device is in motion. For example, the user transportable device may receive input from one or more sensors such as one or more accelerometers, a compass, a GPS device, a communication interface, a microphone, a camera, or any of various other types of sensors able to detect information and provide the information to the user transportable device 100.

At 704, the device determines a current orientation of a display of the user transportable device. For example, if the display of the user transportable device is at an angle at which the user normally holds the device when viewing the display, such as between 0 and 90 degrees from horizontal, then there is a likelihood that the user is viewing or using the display of the device.

At 706, based at least in part on determining that the user transportable devices in motion and further based at least in part on the current orientation of the display, the device obtains an image from a camera oriented at least in part in a direction of travel of the user transportable device. For example, the device may determine from the one or more sensors a direction of travel and may operate a camera that is oriented toward the direction of travel to obtain an image of a region including a predicted path over which the user and the user transportable device will travel.

At 708, the device presents, on the display of the user transportable device, the image obtained from the camera. As one example, the device may present the image as an overlay or picture-in-picture presentation superimposed on the currently presented interface on the display.

At 710, the device determines, based at least in part on the image, that an object in the image is a potential hazard. For instance, the device can identify a potential hazard substantially in an area or region in the direction of travel of the user of the user transportable device. For example, computer vision techniques and pattern recognition may be applied to the image to identify one or more hazards or potential hazards that may be in the predicted path of travel of the user.

At 712, based at least in part on the determining that the object in the image is a potential hazard, the device provides an alert. For example, based at least in part on the identification of the potential hazard in the predicted path of travel, the user transportable device may provide an alert to the user to warn the user of an impending encounter with the object identified as the potential hazard. The alert may be any of a visual alert, an audible alert, or a tactile alert, as discussed above.

FIG. 8 is a flow diagram illustrating an example process 800 that may be executed, at least in part, by a user transportable device according to some implementations.

At 802, the device, based at least in part on sensor information, determines that the device is in motion. For example, the user transportable device may receive input from one or more sensors such as one or more accelerometers, a compass, a GPS device, a communication interface, a microphone, a camera, or any of various other types of sensors able to detect information and provide the information to the user transportable device.

At 804, in response to determining that the user transportable device is in motion, the user transportable device may monitor a region in a direction of travel of the user transportable device. For example, the user transportable device may determine a general direction of travel based on information from one or more sensors. As one example, a GPS device may indicate the direction in which the user is traveling. Additionally, or alternatively, a camera of the device may be used determine a predicted path of travel based on comparison of a sequence of images obtained from the camera to determined the general or average direction of travel. Furthermore, in some examples, prior to initiating monitoring, the user transportable device can determine that the orientation of the display is such that the user may be viewing or is able to view the display.

At 806, the device issues an alert when a hazard is detected in the path of the user and/or the region in the direction of travel of the user transportable device. For example, image analysis of one or more images obtained from the camera may be performed to detect a hazard in the predicted path of the user. In some cases, pattern recognition techniques as discussed herein may be used to identify a hazard from the image.

FIG. 9 is a flow diagram illustrating an example process 900 that may be executed by a remote computing device according to some implementations.

At 902, the computing device receives an image from a user transportable device. For example, the remote computing device may receive one or more images from the user transportable device that were obtained by the device in response to detecting that the device is in motion. Thus, in some implementations, rather than performing the image processing and pattern recognition locally, the user transportable device may offload the processing tasks to a remote computing device.

At 904, the computing device detects an object in the image. For example, the computing device may perform image segmentation and pattern recognition to detect one or more objects in the image received from the user transportable device.

At 906, the computing device sends information related to the object to the user transportable device. For example, the computing device may send information identifying an object in the image that was received from the user transportable device. Furthermore, in some examples, the computing device may identify a hazard in the path of travel of the user and may send an output to the user transportable device that may include an identification of the hazard and/or an alert.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media maintaining instructions that, when executed by one or more processors, cause the one or more processors to perform operations comprising:
   determining, based at least in part on information from a sensor, that a user transportable device is in motion;
   determining a current orientation of a display of the user transportable device;
   based at least in part on determining that the user transportable device is in motion and the current orientation of the display is determined to be an orientation where the display faces away from a direction of motion of the user transportable device, automatically start monitoring for potential hazards, the monitoring for potential hazards comprises:
      obtaining an image from a camera oriented, at least in part, in a direction of travel of the user transportable device;

presenting, on the display of the user transportable device, the image from the camera;

determining, based at least in part on the image, that an object in the image is a potential hazard; and based at least in part on determining that the object in the image is a potential hazard, providing an alert.

2. The one or more non-transitory computer-readable media as recited in claim 1, wherein the determining the object is the potential hazard further comprises recognizing one or more objects in the image that are substantially in the direction of travel.

3. The one or more non-transitory computer-readable media as recited in claim 1, wherein the obtaining the image from the camera is further based, at least in part, on identifying one or more applications or modules presenting information on the display of the user transportable device.

4. The one or more non-transitory computer-readable media as recited in claim 1, wherein the alert includes at least one of:
   a visual alert presented on the display of the user transportable device;
   an audible alert played over a speaker of the user transportable device; or
   a tactile alert generated by a tactile output component.

5. The one or more non-transitory computer-readable media as recited in claim 1, wherein the information from the sensor comprises information received from at least one of:
   an accelerometer;
   a compass;
   a Global Positioning System device;
   a communication interface;
   a sonar device;
   a microphone; or
   the camera.

6. A method comprising:
   under control of one or more processors configured with executable instructions,
   determining, based at least in part on information from a sensor, that a user transportable device is in motion;
   in response to determining that the user transportable device is in motion, presenting, on a display, an image from a camera oriented, at least in part, in a direction of the motion; and
   recognizing one or more objects in the presented image indicating that a user of the user transportable device is driving a vehicle.

7. The method as recited in claim 6, wherein the presenting the image on the display is further based, at least in part, on determining that an orientation of a display of the user transportable device indicates that the display is likely to be viewable by a user.

8. The method as recited in claim 6, wherein the presenting the image on the display is further based, at least in part, on determining that a user has made at least one user input to the user transportable device within a threshold period of time of the determining that the user transportable device is in motion.

9. The method as recited in claim 8, wherein the at least one user input is at least one of a text entry or a touch input.

10. The method as recited in claim 6, wherein the presenting the image on the display is further based, at least in part, on identifying at least one application executing on the user transportable device.

11. The method as recited in claim 6, further comprising determining a likelihood that a user of the user transportable device is in motion based on at least one of:
   detected sustained motion of the user transportable device; or
   detection of motion indicative of a gait of the user.

12. The method as recited in claim 6, wherein the image is of a region in a direction of travel of a user of the user transportable device.

13. The method as recited in claim 6, further comprising determining, based at least in part on the image, that an object in the image is a potential hazard.

14. The method as recited in claim 13, wherein the determining that the object is the potential hazard comprises:
   recognizing the object in the image; and
   determining that the object is the potential hazard based at least in part on at least one of:
      the recognizing the object in the image, or
      the information from the sensor.

15. The method as recited in claim 13, wherein the determining that the object is the potential hazard comprises:
   sending the image to a remote computing device; and
   receiving information related to the potential hazard from the remote computing device.

16. The method as recited in claim 13, further comprising providing an alert on the user transportable device in response to the determining that the object is the potential hazard, wherein the alert comprises at least one of:
   a visual alert;
   an audible alert; or
   a tactile alert.

17. The method as recited in claim 6, further comprising:
   detecting that the user transportable device is no longer in motion; and
   ceasing the presenting of the image from the camera on the display.

18. The method as recited in claim 6, further comprising:
   at least one of:
      providing a warning to the user;
      deactivating at least one hardware component of the user transportable device; or
      deactivating at least one executable module of the user transportable device.

19. The method as recited in claim 6, wherein the information from the sensor comprises information received from at least one of:
   an accelerometer;
   a compass;
   a Global Positioning System device;
   a communication interface;
   a sonar device;
   a microphone; or
   the camera.

20. The method as recited in claim 6, wherein the image is presented as at least one of:
   a partially transparent image overlaid on a user interface;
   an image presented under a partially transparent user interface;
   a portion of the image received from the camera; or
   an augmented image that visually distinguishes one or more objects in the image.

21. A user transportable device comprising:
   one or more processors;
   one or more computer-readable media; and
   one or more modules maintained on the one or more computer-readable media and executed by the one or more processors to perform acts comprising:
      in response to determining that the user transportable device is in motion, monitoring a region in a direction of travel of the user transportable device;

recognizing one or more objects in the monitored region indicating that a user of the user transportable device is driving a vehicle; and providing an alert on the user transportable device when a potential hazard is determined to be in the region in the direction of travel based at least in part on recognizing the one or more objects in the monitored region.

22. The user transportable device as recited in claim 21, the acts further comprising presenting, on a display of the user transportable device, an image from a camera facing, at least in part, the direction of travel of the user transportable device.

23. The user transportable device as recited in claim 21, the acts further comprising:
receiving an image from a camera facing, at least in part, the direction of travel of the user transportable device; and
determining that the potential hazard is in the region based, at least in part, on a content of the image.

24. The user transportable device as recited in claim 21, the acts further comprising:
receiving an image from a camera facing, at least in part, the direction of travel of the user transportable device;
sending the image to a remote computing device; and
receiving, from the remote computing device, information related to the potential hazard based, at least in part, on a content of the image.

25. The user transportable device as recited in claim 21, wherein the determining that the user transportable device is in motion comprises receiving information from at least one of:
an accelerometer;
a compass;
a Global Positioning System device;
a communication interface;
a sonar device;
a microphone; or
the camera.

26. The user transportable device as recited in claim 21, wherein the potential hazard is determined to be in the region based at least in part on information received from at least one of:
an accelerometer;
a compass;
a Global Positioning System device;
a communication interface;
a sonar device;
a microphone; or
the camera.

27. A system comprising:
one or more processors;
one or more computer readable media maintaining one or more instructions executable by the one or more processors to perform operations comprising:
receiving sensor information from a user transportable device;
determining, based at least in part on the sensor information, that the user transportable device is in motion;
receiving orientation information of a display of the user transportable device;
based at least in part on determining that the user transportable device is in motion and the current orientation of the display is an orientation where the display faces away from the direction of motion of the user transportable device, automatically start monitoring for potential hazards, the monitoring for potential hazards comprises:
receiving an image from the user transportable device;
detecting an object in the image; and
sending information to the user transportable device indicating that the object in the image is a potential hazard.

28. The system as recited in claim 27, the operations further comprising receiving sensor information from the user transportable device, wherein the sending the information indicating that the object in the image is the potential hazard is based at least in part on the sensor information.

29. The system as recited in claim 28, wherein:
the potential hazard is determined based, at least in part, on a direction of travel of the user transportable device; and
the direction of travel is determined based at least in part on the sensor information.

* * * * *